(12) United States Patent
Krefta et al.

(10) Patent No.: US 6,232,739 B1
(45) Date of Patent: May 15, 2001

(54) HIGH-RESOLUTION INCREMENTAL POSITION SENSOR WITH PULSE SWITCHING STRATEGY

(75) Inventors: Ronald John Krefta, Noblesville; James E. Walters, Carmel, both of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/502,714

(22) Filed: Feb. 11, 2000

(51) Int. Cl.$^7$ ............................... G05B 1/06; G01B 7/30
(52) U.S. Cl. ................ 318/652; 318/603; 318/715; 324/207.25
(58) Field of Search ........................ 318/652, 602, 318/603, 254, 653, 696, 701, 715; 324/207.14, 207.15, 207.21, 207.22, 207.23, 207.25

(56) References Cited

U.S. PATENT DOCUMENTS

| | | | |
|---|---|---|---|
| 4,766,359 | * 8/1988 | Smith et al. ...................... | 318/652 |
| 4,883,973 | 11/1989 | Lakey et al. . | |
| 5,185,918 | 2/1993 | Shafer, Jr. . | |
| 5,731,702 | 3/1998 | Schroeder et al. . | |
| 5,754,042 | 5/1998 | Schroeder et al. . | |
| 5,811,957 | 9/1998 | Bose et al. . | |
| 5,864,217 | * 1/1999 | Lyons et al. ...................... | 318/652 |
| 5,879,785 | 3/1999 | Shin . | |

OTHER PUBLICATIONS

Library of Congress Catalog Card No. 58–10008; Electrical Machines Direct and Alternating Current, copyright 1950 by the McGraw–Hill Book Company, Inc.; pp. 346–396.

* cited by examiner

Primary Examiner—Khanh Dang
(74) Attorney, Agent, or Firm—Margaret A. Dobrowitsky

(57) ABSTRACT

An apparatus for determining an incremental angular position of a rotating member of an induction motor. A sensor assembly is positioned adjacent a target wheel attached to the rotating member, the target wheel having a plurality of teeth, separated by slots, angularly spaced around the periphery of the target wheel. The sensor assembly is located proximate the periphery of the target wheel, and includes a plurality of sensors each configured to generate a respective output signal that transitions between first and second states at the passage thereby of each leading and trailing edge of the teeth. The apparatus also includes a processing circuit configured to generate an incremental position signal in response to the output signals. Each sensor is spaced from an adjacent sensor by a predetermined distance equal to 180 degrees divided by n, where n is the number of sensors, and 360 degrees is a tooth-to-tooth distance. The processing circuit has a first mode of operation wherein all of the sensor output signals are used to generate the position signal. The processing circuit also includes a second mode of operation wherein a second number less than all of the output signals are used to generate the position signal. The processing circuit is configured to switch from the first mode to the second mode when the rotating member reaches a predetermined speed.

13 Claims, 3 Drawing Sheets

HIGH-RESOLUTION INCREMENTAL POSITION SENSOR WITH PULSE SWITCHING STRATEGY

BACKGROUND OF THE INVENTION

1. Field of the Invention

This invention relates generally to an apparatus for determining a position of a rotating member of an electric machine, and, more particularly, to an apparatus for accurately determining the position having a pulse switching strategy.

2. Disclosure of Related Art

For conventional variable frequency induction machines (i.e., electric induction motors), it is desirable to determine incremental angular position of the rotor. The incremental position is used to control the stator electrical excitation frequency so as to maintain a desired slip frequency (i.e., the difference between the rotor speed or frequency and the applied stator excitation frequency). As known, failure to maintain the proper slip frequency will result in a loss of torque production as well as a loss in efficiency.

A number of position determining approaches are known. For example, it is known to employ a rotating, ferromagnetic target wheel and a sensor to determine position. Exemplary of this approach is seen by reference to U.S. Pat. No. 5,754,042 entitled "MAGNETORESISTIVE ENCODER FOR TRACKING THE ANGULAR POSITION OF A ROTATING FERROMAGNETIC TARGET WHEEL" issued to Schroeder et al. Schroeder et al. disclose a target wheel having a plurality of teeth, separated by slots, angularly spaced around the periphery thereof. Schroeder et al. further disclose two magnetoresistive (MR) sensors positioned adjacent the target wheel, each generating a signal with transitions between two voltage levels at the passage of the leading and trailing edges of a tooth. As applied to induction machines, it is further known to use two sensors (fixed MR or Hall effect) in quadrature (i.e., the sensors are spaced apart a distance equal to one-half tooth). The state transitions or "edges" of the sensor output signal, which correspond to the leading and trailing edges of the tooth as it passes the sensor, are counted by a controller to calculate incremental position.

As further background, it is a characteristic of induction machines to require the highest incremental position resolution at relatively low speeds, when the time between successive pulses is longest, and the acceleration rate of the machine is typically the greatest. At high rotational speeds, the time between successive incremental position pulses is short, relative to the rotor acceleration rate, and thus the resultant speed error given acceleration over time is relatively low. Hence a lower resolution encoder is allowable. However, during startup or at low speeds, a resultant speed error given acceleration over time becomes unacceptably large, which limits the torque production of the induction machine and the response time of the system including the machine.

One approach therefore, taken in the art, is to simply provide a single, high resolution sensing system to accommodate the high-resolution requirements of relatively low speed operation. However, there are shortcomings to this approach. For example, optical encoders, if used, provide high resolution, but are costly. Alternatively, the target wheel in a sensor/target wheel approach can be made to have more teeth, thereby increasing resolution. There are, however, several factors limiting the number of teeth that can be produced on the target wheel (i.e., the greater number of teeth, the higher the resolution). First, as to manufacturing costs, tolerance requirements for a very high tooth-count target wheel and the increased time to form such a wheel add to the overall cost of the system. Second, magnetic design constraints limit the number of teeth that can be sensed on a target wheel of a given diameter. That is, proper operation of the sensors requires a minimum spacing between teeth. Finally, there are electrical concerns. The sensor devices conventionally used have predetermined rise and fall times (i.e., for the sensor output signal to transition between low and high states when passing leading and trailing edges of a tooth). At low speeds, such rise and fall times are generally inconsequential. However, at higher speeds, the rise and fall times interfere in applications where two sensors are used in quadrature. That is, at high speeds, the rise and fall times may causes the fall of the first sensor output signal to substantially coincide in time with the rise of a second, adjacent sensor output signal, rather than be spaced apart by one-half tooth (e.g., in quadrature). This can confuse edge detection circuitry into only recognizing one "edge" when two "edges" should be counted. This situation leads to errors in determining incremental position. Thus, rise and fall times, tolerances, and duty cycle also limit the number of teeth on the target wheel.

There is therefore a need to provide an apparatus for position determination that minimizes or eliminates one or more of the shortcomings as set forth above.

SUMMARY OF THE INVENTION

An apparatus for determining a position of a rotating member of an electric machine in accordance with the present invention is characterized by the features specified in claim 1.

An apparatus for determining incremental position of a rotating member according to the invention has as one advantage a reduced cost relative to comparable resolution conventional sensing systems. Another advantage of the present invention is that a higher resolution apparatus can be provided as compared to a conventional sensing system having a similar cost. The cost can be reduced and/or resolution can be increased, in accordance with the invention, by providing a plurality of sensors in a sensor assembly to be utilized with a target wheel having a reduced number of teeth. A lower tooth-count target wheel is less expensive to manufacture than a higher tooth-count target wheel, all other factors being the same.

These and other advantages are realized by an apparatus according to the invention for determining a position of a rotating member of an electric machine. The apparatus includes a target wheel, a sensor assembly and a processing circuit. The target wheel is configured to have a plurality of teeth, separated by slots, angularly spaced around the periphery thereof. The sensor assembly is located proximate the periphery and has a plurality of sensors each configured to generate a respective output signal that transitions between first and second states at the passage thereby of a respective leading and trailing edge of each tooth. The processing circuit is provided for generating a position signal in response to the sensor output signals, characterized in that: each sensor is spaced from an adjacent sensor by a predetermined distance; and, the processing circuit has (i) a first mode of operation wherein a first number of the plurality of sensor output signals are utilized to generate the position signal, and (ii) a second mode of operation wherein a second number of sensor output signals different from the first number are utilized to generate the position signal, the processing circuit being configured to switch from the first mode to the second mode when the rotating member reaches a first predetermined speed. Preferably, the second number is less than the first number. By increasing the number of sensors, more sensor output signal transitions or "edges" can be generated per tooth, providing increased resolution, particularly useful for low speed operation. Therefore, a lower tooth-count target wheel can be used to obtain comparable resolution as conventional systems. At higher speeds, where rise/fall times of the sensors may interfere, as described above, and where high resolution is not needed, the number of sensor output signals used is reduced (i.e., ignoring pulses from several sensors), thereby eliminating the electrical problem described above.

BRIEF DESCRIPTION OF THE DRAWINGS

The present invention will now be described by way of example, with reference to the accompanying drawings, in which.

DETAILED DESCRIPTION OF THE PREFERRED EMBODIMENT

Figure 1:
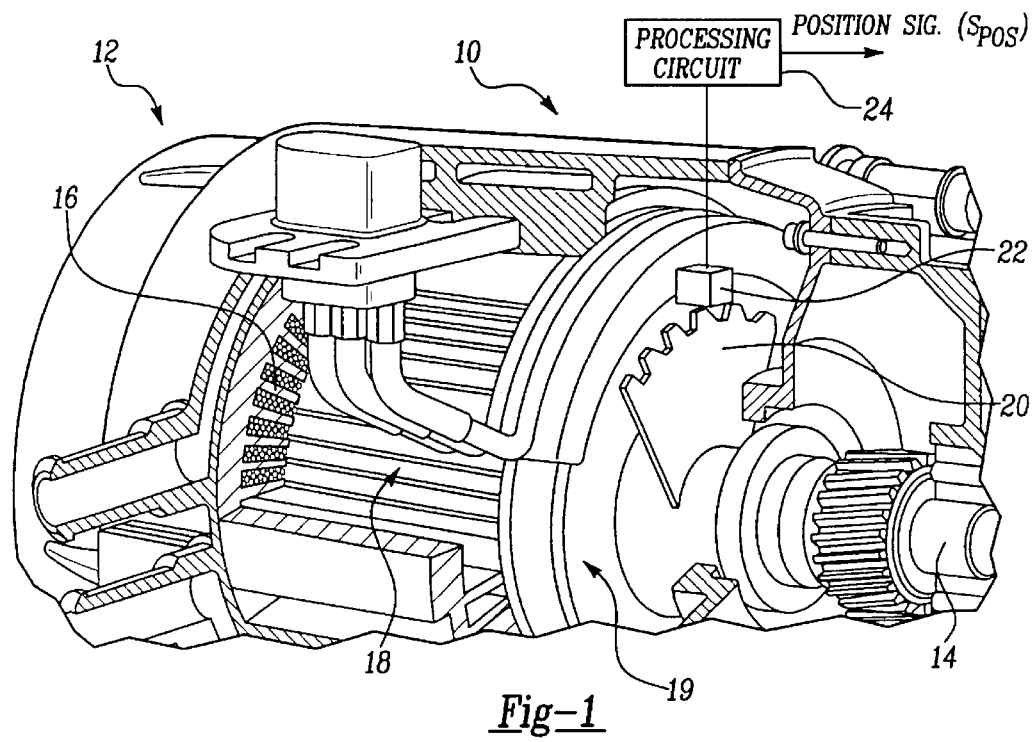
FIG. 1 is a perspective view of an electric machine, with portions broken away, and, an apparatus for determining a position of a rotating member of the electric machine in accordance with the present invention.

Referring now to the drawings wherein like reference numerals are used to identify identical components in various views, FIG. 1 is perspective view showing an apparatus 10 for determining a signal indicative of an incremental position of a rotating member of an electric machine 12.

Electric machine 12, in a constructed embodiment, is a variable frequency induction machine having a conventional configuration. Machine 12 is of the type that may be driven or fed by a conventional inverter (not shown) that can vary the frequency and voltage applied to the stator windings of the machine. Electric machine 12 may be employed, for example, in a starter-alternator configuration, or in a hybrid and electric vehicle application. Electric machine 12 may include a rotating member, such as a shaft 14, a stator assembly 16 having a stator body wound with stator windings, and a rotor assembly 18 having shorted ends 19. Shaft 14 and rotor assembly 18 are configured to rotate together as a unit. In all other respects, electric machine 12 may comprise conventional apparatus known to those of ordinary skill in the art.

As used herein, "resolution" means the smallest angular distance that a target wheel or rotor has rotated, as can be positively detected by a sensor system. The apparatus described herein generates an "edge" or "pulse" every time the target wheel has further rotated such a predetermined angular distance. Thus, each "edge" or "pulse" is indicative of the fact that the target wheel's position has incrementally rotated that angular distance. Apparatus 10 achieves a desired resolution at a lower cost by increasing the number of sensors while reducing in a corresponding amount the number of teeth on the target wheel. Apparatus 10, according to the invention, includes a target wheel 20, a sensor assembly 22, and a processing circuit 24. As shown in FIG. 1, processing circuit 24 generates a position signal, more particularly, an incremental position indicative signal $S_{POS}$, sometimes referred to herein as the position signal $S_{POS}$. The $S_{POS}$ signal is indicative of an incremental position change of the target wheel 20. This signal may thereafter be employed to control an excitation signal produced by an inverter (not shown) for energizing the stator windings of electric machine 12. While the preferred embodiment of the present invention will be described in connection with a variable frequency induction motor, it should be understood that the apparatus in accordance with the invention may be applied and/or used with other electric machines where position information is required or desirable. The target wheel in FIG. 1, as well as the sensor assembly 22, are arbitrarily illustrated and located. Any number of variations are possible.

Figure 2:
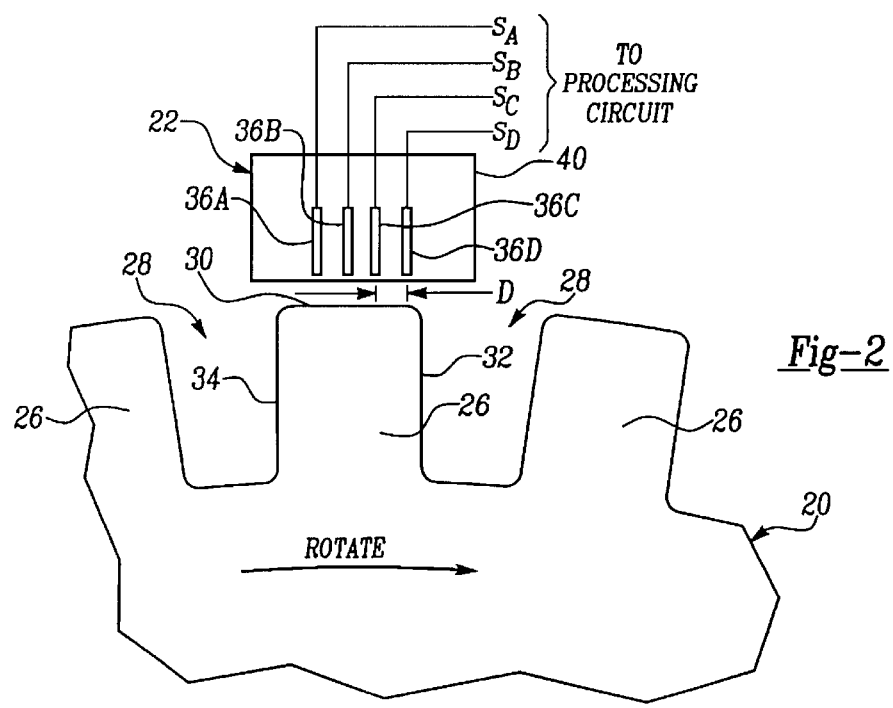
FIG. 2 is a plan view, showing in greater detail, a target wheel and sensor assembly in accordance with the present invention.

Referring now to FIG. 2, target wheel 20 may be formed of magnetically permeable material, such as ferrous material, for example cold-rolled steel, or powdered iron material. Target wheel 20 has a plurality of teeth 26, separated by intervening slots 28, angularly spaced around the periphery 30 thereof. Each tooth 26 includes a respective leading edge 32, and trailing edge 34, with respect to the orientation of rotation, as shown by the line with an arrowhead in FIG. 2. Target wheel 20 may have a disc-like shape of a predetermined outside diameter. For example, in one embodiment, the diameter may be approximately 319.450 mm wherein the target wheel 20 includes 256 slots equally spaced about the periphery 30, each slot being approximately 2.0 mm wide at the tip. As illustrated, the respective widths of the teeth and the slots are approximately equal; however, variations may be made and remain within the spirit and scope of the present invention. Target wheel 20 is configured to be mounted to rotating member 14 of machine 12, for example, to shaft 14.

Sensor assembly 22 is located proximate periphery 30 of target wheel 20 by any conventional means, as shown diagrammatically as a block connection in FIG. 1. Sensor assembly 22 includes a plurality of sensors 36, n in number, where n equals any number greater than or equal to 2. In the illustrated embodiment, there are four sensors 36, designated $36_A$, $36_B$, $36_C$, and $36_D$, in FIG. 2. Each of the sensors $36i$, where i=A–D, is configured to generate a respective output signal $S_A$, $S_B$, $S_C$, and $S_D$, that transitions between first and second states at the passage thereby of leading edge 32, and trailing edge 34 of each tooth 26. Sensors $36i$ may comprise conventional apparatus known to those of ordinary skill in the art, for example, fixed magnetoresistive (MR) or Hall effect sensors. Each sensor is spaced from an adjacent sensor by a predetermined distance, designated "D" in FIG. 2. The predetermined distance D comprises an angular displacement defined by an angle of 180/n degrees, where 360 degrees corresponds to the distance between corresponding points on two successive, adjacent teeth 26, and where n equals the number of sensors $36_i$, n being greater than or equal to two. In the illustrated embodiment, there are four sensors so that the predetermined distance D is approximately equal to 45 degrees (180/4=45°). In an alternate embodiment, "D" may be approximately equal to 45°+ n*360°, where each sensor output is out of phase by a whole tooth. The plurality of sensors $36_i$ may be mounted, in one configuration, at the die level, having the required tolerances for "D", in a single molded case 40.

Figure 3:
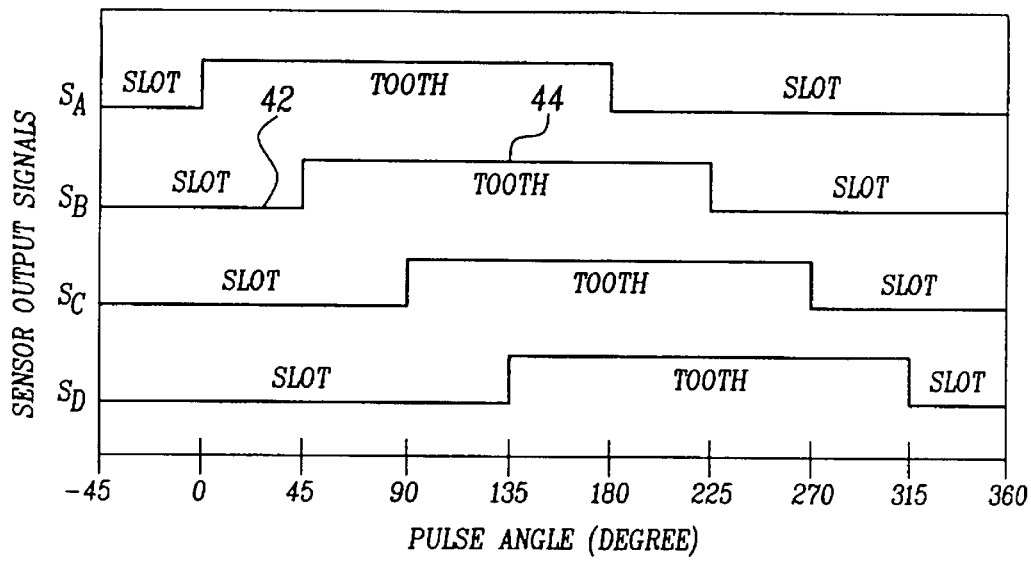
FIG. 3 is a simplified timing diagram showing signal transitions for respective sensor output signals from the sensor assembly of FIG. 2.

FIG. 3 is a simplified timing diagram view of the respective output signals of sensors $36_i$. In the illustrated embodiment, each sensor output signal transitions from a first, low state 42 to a second, high state 44 when passing a respective leading edge 32 (i.e., slot-to-tooth), and likewise transitions from a high state 44 to a low state 42 when passing a respective trailing edge 34 (i.e., tooth-to-slot). In the illustrated embodiment, each "edge" of the sensor output signals, when viewed collectively as in FIG. 3, is separated by a pulse angle of 45 degrees. In addition, note that since the tooth-to-slot width ratio is approximately 1:1, each of the sensor output signals has a duty cycle of approximately 50%.

Figure 4:
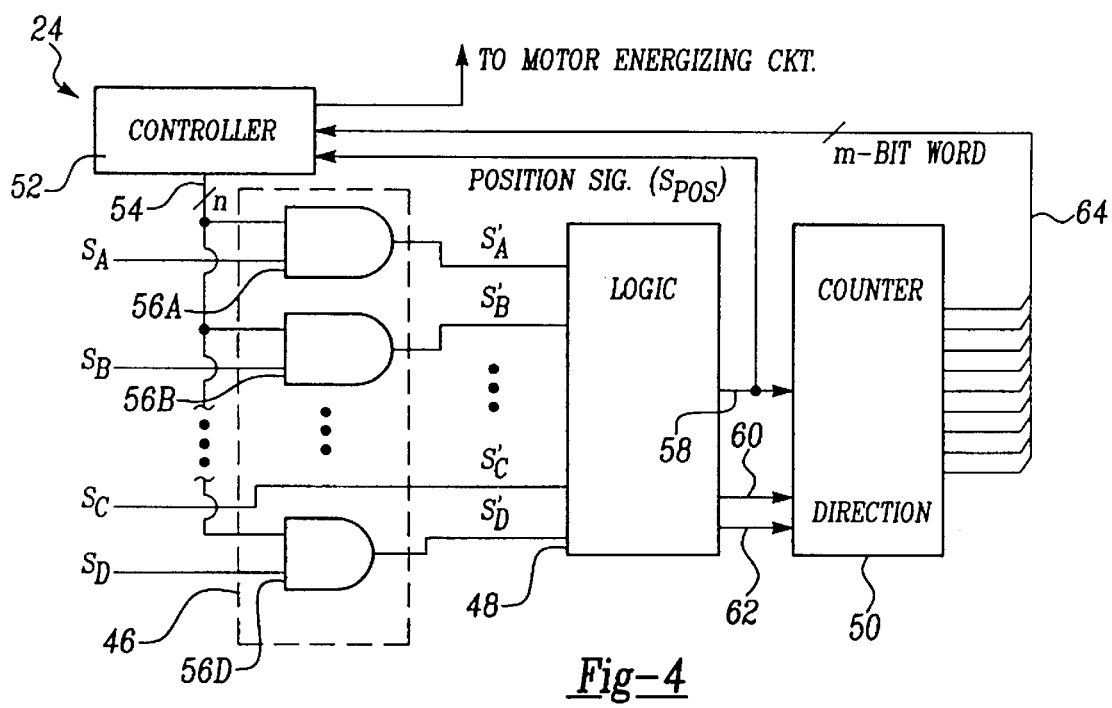
FIG. 4 is a simplified schematic and block diagram view of a processing circuit for generating a position signal in accordance with the present invention.

FIG. 4 shows processing circuit 24 in greater detail. Processing circuit 24 is configured generally to generate the incremental position indicative signal $S_{POS}$ in response to sensor output signals $S_A$, $S_B$, $S_C$, and $S_D$.

Processing circuit 24 includes a selector circuit 46, a logic circuit 48, an optional counter 50, and a controller 52.

Selector circuit 46 is configured to generate signals $S'A$, $S'B$, $S'C$, and $S'D$ in response to the plurality of sensor output signals $S_A$, $S_B$, $S_C$, and $S_D$. More particularly, selector circuit 46 selects one or more of the signals appearing on its input (i.e., the sensor output signals $S_A$, $S_B$, $S_C$, and $S_D$) based on a control signal 54 generated by controller 52. In the illustrated embodiment, selector circuit 46 comprises a plurality of AND gates $56_A$, $56_B$, $56_D$. As illustrated, there are (n−1) separate control signals 54, one for each of the AND gates. Based on the configuration illustrated in FIG. 4, controller 52 can selectively mask or inhibit one or more of the signals $S_A$, $S_B$, and $S_D$ from flowing to the output lines of selector circuit 46 depending on what mode of operation it is in. As described in greater detail hereinafter, controller 52 switches between multiple modes of operation based on a speed of rotating member 14. It should be understood that there are a plurality of alternative configurations known to those of ordinary skill in the art to accomplish the function of selector circuit 46.

Logic circuit 48 is configured to generate the incremental position indicative signal $S_{POS}$ using the outputs from selector circuit 46. Logic circuit 48 is operative to pass all of the signal state transitions or "edges" appearing on its input to an output line 58 thereof on which the incremental position indicative signal $S_{POS}$ is generated. Logic circuit 48 may further be configured to provide a direction signal on output lines 60, and 62 indicative of which direction (i.e., clockwise, or counter-clockwise) rotating member 14 is moving. Direction may be determined by identifying which of any two sensor output signals occur first. Logic circuit 48 may comprise a logical OR circuit. It should be understood that there are alternative configurations adapted to accomplish the function of logic circuit 48.

Counter 50 is responsive to signal $S_{POS}$, as well as the state of the direction signal on lines 60, 62 to either increment or decrement an m-bit digital output thereof. Counter 50, may comprise an "edge" or pulse actuated counter known in the art. Depending on the nature of logic circuit 48, which may assume a variety of configurations having a corresponding variety of outputs (e.g., a pulse output for each "edge" received on its inputs, a state transition for each "edge" received on its inputs, etc.), a corresponding counter 50 may be selected. It should be understood that counter 50 is optional according to the invention, to be used in a cost effective implementation that also includes an indexed data table (details below). The incremental position signal $S_{POS}$ may be processed directly by controller 52 for use in controlling energization of motor 12.

Controller 52 may comprise conventional components known to those of ordinary skill in the art. For example, controller 52 may comprise discrete components configured to accomplish the functions described herein (e.g., select a mode based on the speed of rotating member 14 and generate control signals 54 accordingly). Alternatively, controller 52 may be a microcontroller programmed to accomplish the functions as described herein as well as functions known to those of ordinary skill as being required or desired to control a motor.

Figure 5:
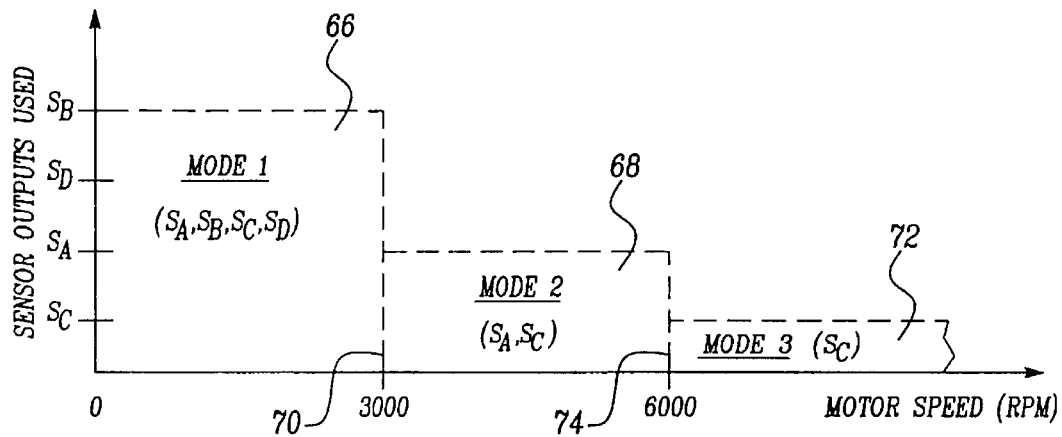
FIG. 5 is a diagram view depicting a plurality of modes of operation of the apparatus in accordance with the present invention; and, FIG. 6 is a simplified timing diagram view of the position signal for each of the modes of operation shown in FIG. 5.
Figure 6:
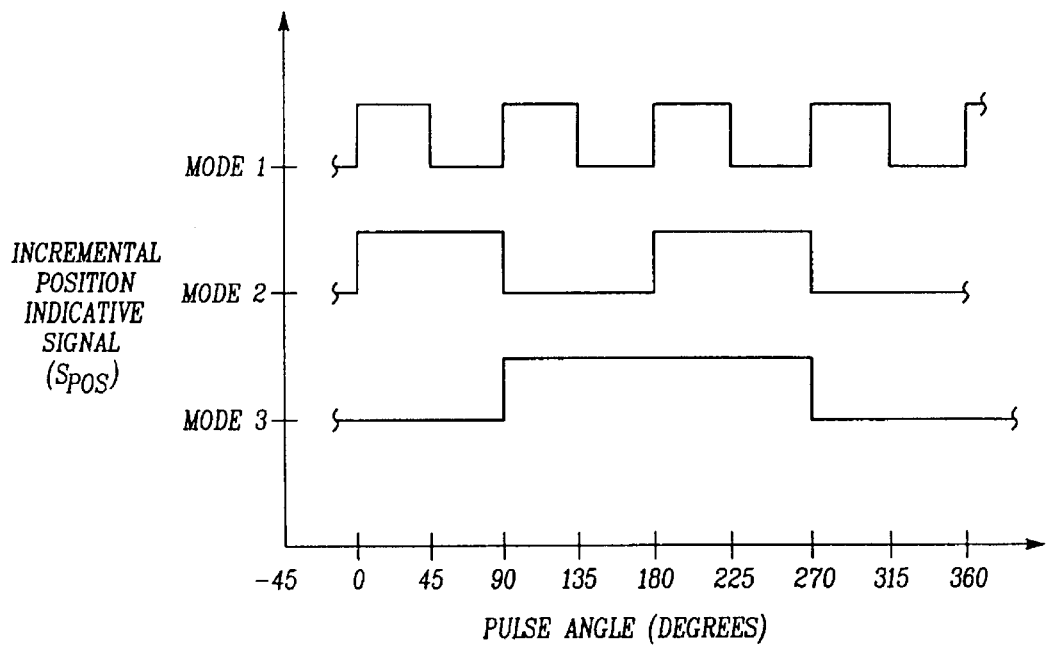

Referring now to FIGS. 5 and 6, apparatus 10, in accordance with the present invention, operates in different modes of operation depending on the speed of rotating member 14. In particular, processing circuit 24 has a first mode of operation 66 wherein a first number of sensor output signals, namely signals $S_A$, $S_B$, $S_C$, and $S_D$ in the illustrated embodiment, are utilized in generating signal $S_{POS}$. Processing circuit 24 further includes a second mode of operation 68 wherein a second number of sensor output signals different from the first number of sensor output signals are used to generate the position signal $S_{POS}$. In the second mode 68, signals $S_A$, and $S_C$ may be used to generate signal $S_{POS}$. Significantly, processing circuit 24 is configured to switch from first mode 66 to second mode 68 when the rotating member 14 reaches a first predetermined speed 70, which in the illustrated embodiment is an exemplary 3000 rpm. Processing circuit 24 may also include a third mode of operation 72, wherein a third number different from the second number of sensor output signals are utilized to generate signal $S_{POS}$ when rotating member 14 reaches a second predetermined speed 74, which is greater than the first predetermined speed 70. In the illustrated embodiment, the third number of sensor output signals comprise solely one signal, namely, signal $S_C$. The second predetermined speed may be an exemplary 6000 rpm.

Thus, in the illustrated embodiment, on start up, all four sensors $S_A$, $S_B$, $S_C$, and $S_D$ can be used to achieve an increased, desired incremental angular position resolution. For each tooth 26 of target wheel 20 that completely passes sensor assembly 22, there will be eight signal transitions or "edges", collectively, among the four output signals $S_A$, $S_B$, $S_C$, and $S_D$. In the first mode of operation 66, controller 52 asserts all of the control signals 54 provided to selector circuit 46. The asserted control signals 54 condition respective AND gates $56_A$, $56_B$, and $56_D$ such that inputs thereto simply pass to the output lines thereof. These are signals $S'A$, $S'B$, $S'C$ and $S'D$. Logic circuit 48 combines the "edges" appearing in all the signals $S'A$, $S'B$, $S'C$ and $S'D$ to generate the $S_{POS}$ signal. The resulting signal $S_{POS}$ is shown in the top trace of FIG. 6 as an exemplary waveform having eight "edges". It bears emphasizing that the top trace occurs in the first mode of operation (e.g., at startup and below the first predetermined speed).

As the speed of rotating member 14 increases to reach first predetermined speed 70, the number of "edges" or pulses can be reduced by a factor of two so that there will only be four edges per tooth 26. This is done by masking outputs $S_B$ and $S_D$. This reduction will prevent two sensor output signals from changing states too closely together, and the resultant loss of information related thereto as described in the Background. In the second mode of operation 68, controller 52 asserts only the control line 54 provided to AND gate $56_A$. This conditions AND gate $56_A$ to pass sensor output signal $S_A$ through as signal $^{S'}A$. AND gates $56_B$ and $56_D$ are not enabled, so they operate to mask signals $S_B$ and $S_D$. Again, logic circuit 48 combines the "edges" of signals $^{S'}A$, and $^{S'}C$ to generate the $S_{POS}$ signal. This is shown in the middle trace of FIG. 6 as an exemplary waveform having four "edges".

As the speed of rotating member 14 increases to reach second predetermined speed 74, processing circuit 24 transitions from the second mode 68 to the third mode of operation 72, wherein only the output of sensor $36_C$, namely signal $S_C$, is used to generate the position indicative signal $S_{POS}$. In the third mode of operation 72, controller 52 does not assert any of the control signals 54; accordingly, only signal $S_C$ (which is not gated) is passed through. This is shown in the bottom trace of FIG. 6.

Referring again to FIG. 4, controller 52 can be programmed to determine the speed of rotating member 14 by analyzing (i) the incremental position indicative signal $S_{POS}$, (ii) timing data, and, (iii) information as to what mode of operation it is in (this affects the "distance" traveled by rotating member 14 between successive "edges" as appearing in the $S_{POS}$ signal). Controller 52, based on this determination, can switch between first, second, and third modes 66, 68, and 72. Once the mode of operation is determined, controller 52 can assert, or de-assert, one or more of the control signals 54 to circuit 46 so as to achieve the selection, as described hereinbefore.

Counter 58 is optionally included to provide a low cost implementation for motor control. As an exemplary use, the m-bit word 64 generated by counter 50 may be provided or used as an index into a memory to retrieve a data word corresponding to an excitation signal for energizing electric machine 12. For example, assuming a 72-entry data table in the memory of controller 52, counter 50 can be configured as a 72-count up/down counter. Thus, upon each edge or pulse received, counter 50 will increment or decrement its output, thereby providing a means to step through the table stored in the memory. The foregoing principle applies to the other modes of operation (e.g., the third mode of operation 72 wherein only ¼ of the pulses of the first mode of operation are received by counter 50, requiring a corresponding adjustment in the data entries in the data table, and the configuration of the counter).

When transitioning from one mode of operation to the next higher mode of operation, the following relationships apply: if the number of sensors is even, then the number utilized in accordance with the present invention can be reduced by a factor of 2. If the number of sensors is odd, then the number of sensors in accordance with the invention can be reduced by at least ((n−1)/2)+1.

An apparatus in accordance with the invention has one advantage of providing increased incremental position resolution of a rotating member using a lower cost, lower tooth-count target wheel. Correspondingly, the invention, on a dollar-per-dollar basis, provides increased resolution compared to conventional configurations.

It is to be understood that the above description is merely exemplary rather than limiting in nature, the invention being limited only by the appended claims. Various modifications and changes may be made thereto by one of ordinary skill in the art which embodies the principles of the invention and fall within the spirit and scope thereof.

We claim:

1. An apparatus for determining a position of a rotating member of an electric machine including a target wheel having a plurality of teeth, separated by slots, angularly spaced around a periphery thereof, said target wheel being configured to be mounted to the rotating member, and a sensor assembly proximate said periphery having a plurality of sensors each configured to generate a respective output signal that transitions between first and second states at the passage thereby of each leading and trailing edge of said teeth, and a processing circuit generating a position signal in response to said output signals, characterized in that:

each sensor being spaced from an adjacent one of said sensors by a predetermined distance; and, said processing circuit having a first mode of operation wherein a first number of said plurality of output signals are utilized to generate said position signal, said processing circuit further having a second mode of operation wherein a second number of said output signals different from said first number are utilized to generate said position signal, said processing circuit being configured to switch from said first mode to said second mode when said rotating member reaches a first predetermined speed.

2. The apparatus of claim 1 wherein said predetermined distance is equal to 180 degrees divided by the number of said plurality of sensors, 360 degrees corresponding to a tooth-to-tooth angular spacing on said target wheel.

3. The apparatus of claim 1 wherein said number of sensors equals four, and said predetermined distance is equal to forty-five degrees.

4. The apparatus of claim 1 wherein said plurality of sensors are integrally formed on a die.

5. The apparatus of claim 4 wherein said die is overmolded to form a case.

6. The apparatus of claim 1 wherein said processing circuit further includes a third mode of operation wherein a third number different from said second number of said output signals are utilized to generate said position signal when said rotating member reaches a second predetermined speed greater than said first predetermined speed.

7. The apparatus of claim 1 wherein said processing circuit includes:

a selector circuit configured to generate one of said first number of said output signals and said second number of output signals based on the speed of the rotating member.

8. The apparatus of claim 7 wherein said processing circuit further includes a logic circuit coupled to said selector circuit configured to generate said position signal.

9. The apparatus of claim 8 wherein said processing circuit includes a controller configured to generate a plurality of control signals as a function of said mode of operation, said control signals being provided to said selector circuit.

10. The apparatus of claim 8 wherein said logic circuit includes a logical OR circuit.

11. The apparatus of claim 9 further including a counter responsive to said position signal and configured to generate in response thereto a multi-bit digital word, said digital word being operative for indexing into a memory to retrieve a corresponding data word, said data word corresponding to an excitation signal for energizing said electric machine.

12. The apparatus of claim 7 wherein said selector circuit comprises a respective AND logic circuit for each output signal.

13. The apparatus of claim 9 wherein said controller includes means for selecting said mode of operation as a function of said position signal and a time parameter.

* * * * *